United States Patent [19]

Loizeau

[11] Patent Number: 4,496,036
[45] Date of Patent: Jan. 29, 1985

[54] TORSIONAL DAMPERS

[75] Inventor: Pierre Loizeau, Ville D'Avray, France

[73] Assignee: Valeo, Paris, France

[21] Appl. No.: 317,175

[22] Filed: Nov. 2, 1981

[30] Foreign Application Priority Data

Nov. 3, 1980 [FR] France .............................. 80 23447
Nov. 3, 1980 [FR] France .............................. 80 23446

[51] Int. Cl.³ .............................................. F16D 3/66
[52] U.S. Cl. .............................. 192/106.2; 192/70.17; 464/68
[58] Field of Search .............. 192/106.1, 106.2, 70.17, 192/55; 464/68, 66, 57

[56] References Cited

U.S. PATENT DOCUMENTS

| 1,975,772 | 10/1934 | Davis | 192/106.1 |
| 2,114,247 | 4/1938 | Davis | 192/68 |
| 2,141,014 | 12/1938 | Nutt | 192/106.1 |
| 3,387,505 | 6/1968 | Rumsey | 74/574 |
| 3,788,099 | 6/1971 | Miller | 192/106.1 X |
| 4,044,874 | 8/1977 | Worner | 192/106.2 |

FOREIGN PATENT DOCUMENTS

| 139328 | 11/1950 | Australia | 192/106.1 |
| 88012 | 5/1965 | France | |
| 1423139 | 11/1965 | France | |
| 2225650 | 4/1974 | France | |
| 2260026 | 1/1975 | France | |
| 2370902 | 11/1976 | France | |
| 557489 | 5/1946 | United Kingdom | |
| 1025609 | 4/1966 | United Kingdom | |
| 1375896 | 11/1974 | United Kingdom | |
| 1400249 | 7/1975 | United Kingdom | |

Primary Examiner—Rodney H. Bonck
Assistant Examiner—James J. Merek
Attorney, Agent, or Firm—Charles E. Brown

[57] ABSTRACT

The torsional damper comprises at least two coaxial parts mounted to rotate relative to one another. Circumferentially acting elastic means resist such relative angular movement and incorporate an elastically deformable arm. This arm extends between two support members with at least one of which it is integral via a respective root area. These support members are engaged with respective rotating parts so as to rotate therewith over at least part of a defined range of relative angular movement. The torsional damper is particularly suited to applications in friction clutches incorporating a damper hub, for use in particular in automotive vehicles.

25 Claims, 22 Drawing Figures

TORSIONAL DAMPERS

BACKGROUND OF THE INVENTION

1. Field of the invention

The present invention concerns a torsional damper comprising at least two coaxial parts mounted to rotate relative to one another within a defined range of relative angular movement and circumferentially acting elastic means resisting such relative angular movement.

2. Description of the prior art

This type of torsional damper is normally incorporated in the design of a friction clutch, particularly for automotive vehicles, in which case one coaxial part comprises a friction disk designed to rotate with a first shaft, in practice a driving shaft and the motor output shaft in the case of an automotive vehicle, whereas another of said coaxial parts is carried on a hub designed to rotate with a second shaft, in practice a driven shaft and the gearbox input shaft in the case of an automotive vehicle.

This type of device is used to permit regulated transmission of rotational torque applied to one of its coaxial parts where the other is itself subject to a rotational torque. It is thereby able to filter vibrations which may arise at any point in the kinematic system in which it is incorporated, extending from the motor to the driven road wheels in the case of an automotive vehicle.

The circumferentially acting elastic means usually comprise only helical springs, each disposed substantially tangentially relative to a circumference of the damper assembly. Each individual spring is housed partly in an opening formed in an annular member constituting part of one of the coaxial parts, such as a transversely disposed disk or flange, for example, and partly in an opening formed in a parallel component constituting part of the other of said coaxial parts, in the form of a ring, for example.

The housing of these springs in the respective components raises serious problems in that forming the necessary openings reduces their mechanical strength.

In view of the minimum mechanical strength to be achieved and the generally limited spaced available, as measured in the radial direction, generally ruling out the installation of springs on two separate concentric circumferences of the damper assembly, there is frequently an upper limit in respect of the number of springs which may be used with corresponding limitations in respect of at least some of the operating characteristics of the torsional damper.

It has alreay been proposed to use at least one elastically deformable arm as the circumferentially acting elastic means in order to overcome this difficulty.

In U.S. Pat. No. 2,114,247 all the circumferentially acting elastic means comprise elastically deformable arms, of which there are two, one acting when the transmitted torque is increasing and the other when it is decreasing.

Each of the elastically deformable arms disclosed in this U.S. Patent is formed by helically winding a bar which is substantially square in transverse cross-section. The helical winding is difficult to achieve in practice. The elastically deformable arm extends from one end, in practice its inner end, shaped as a right-angle bracket and attached radially to one of the rotating parts of the torsional damper, to a second end, in practice its outer end formed as a hook which connects it to the second of said rotating parts.

Thus at one of its ends at least, in this instance its inner end, this kind of elastically deformable arm is attached by means of a flanged connection so that in operation the resulting deformation of the arm leads to problems of binding and of wear in the corresponding engagement area.

At its other end, in this instance the outer end at which it is coupled to one of the rotating parts of the torsional damper, there are problems of binding and wear in operation as the contact whereby this end is coupled to said rotating part is a pivoting one and therefore subject to friction.

In French Pat. No. 1423139 the circumferentially acting elastic means are only partially constituted by an elastically deformable arm.

This elastically deformable arm is cut out from a thin plate which is disposed transversely and whose thickness in transverse cross-section and in the axial direction is small in comparison with its dimension in the radial direction, so that the space required for the arm in the axial direction is minimal.

In French Pat. No. 1423139, however, the elastically deformable arm is coupled to the two rotating parts between which it is disposed by means of pivots so that, as with the previous disclosure, there are problems of binding and wear at these pivots in operation.

The object of the present invention is to provide an arrangement which overcomes these disadvantages and also offers further advantages.

SUMMARY OF THE INVENTION

The present invention consists in a torsional damper suitable for use in a friction clutch plate, comprising at least two coaxial parts mounted to rotate relative to one another within a defined range of relative angular movement, circumferentially acting elastic means between said parts resisting such relative angular movement and incorporating at least one elastically deformable arm cut from thin plate, two support members between which said elastically deformable arm extends and with at least one of which it is integral via a respective root area, means for positively engaging one of said support members with one of said parts so as to rotate therewith, and drive means on the other of said support members for engaging it with the other of said parts so as to rotate therewith for at least part of said defined range of relative angular movement.

The aforementioned drive means may constitute positive engagement means acting in both directions of rotation and throughout relative angular movement between the respective rotating parts.

Alternatively, these drive means may act unilaterally for one direction of rotation only, and over part only of said relative angular movement.

In operation there is no risk of binding, corrosion or wear in the root area of the elastically deformable arm, as this root area is integral with the arm and with the support member between which it lies, with no rubbing contact.

Thus at least in this root area the operating characteristics of the assembly are stable with time, with no change occurring with time due to, for example, corrosion.

The elastically deformable arm is preferably integral with each of the support members between which it extends, via a respective root area.

As the plate from which it is cut is thin it does not significantly alter the dimension of the torsional damper in the axial direction. Moreover, it is capable of transmitting the torque applied to one of the two rotating parts of the damper to the other on its own, for low values of this torque in either direction. It therefore offers the advantage of saving the space usually taken up by the helical springs used for this purpose.

The space saved may be used, for example, to improve the layout of the remaining springs for higher values of torque and/or to improve the distribution of the action of these springs in accordance with the degree of relative angular movement and so to improve the transmission of torque between the two rotating parts.

Alternatively, this space may be used to fit additional springs to increase the maximum torque rating for the torsional damper.

In this case and using otherwise conventional components it is possible to add a plate from which an elastically deformable arm is cut in accordance with the invention to produce torsional dampers with different characteristics, favoring the rational manufacture of such dampers and thereby reducing the associated cost. The plate used for this purpose may be flat.

In an alternative arrangement, the two support members between which the elastically deformable arm extends may be offset relative to one another in the axial direction. This increases the mechanical strength of the assembly, by increasing its resistance to buckling, and enables the elastically deformable arm to overlap one or both of its support members in the axial direction when in service, so as to increase the working capacity of the arm.

In accordance with a subsidiary feature of the invention, friction means are disposed between said parts with axially acting clamping means associated therewith. The plate from which the elastically deformable arm is cut out may also be used to constitute these axially acting elastic clamping means.

For example, at least one of the support members of the elastically deformable arm may be corrugated in the circumferential direction, like the annular springs commercially available under the Trade Mark "ONDU-FLEX". Alternatively or additionally, the elastically deformable arm may itself be formed with such corrugations.

In this case the plate from which the elastically deformable arm is cut out has a dual role, firstly to transmit torque from one rotating part to the other and secondly to contribute to the generation of a hysteresis effect, as reflected in a difference, for the same value of relative angular movement between said parts, between the value of the torque when the torque is increasing and the value of the torque when the torque is decreasing.

This arrangement produces a proportionate reduction in the number of components used.

According to a further feature of the invention, this plate may have a third function which is to center the two rotating parts relative to one another in the radial direction.

To this end, of said parts comprises at least two coaxial centering lugs radially engaged with one of the support members of the elastically deformable arm and the other of these support members is rigidly attached to the other of said parts.

In accordance with a yet further feature of the invention the circumferentially acting elastic means disposed between said parts comprise, in addition to the elastically deformable arm, at least one drive spring, the stiffness of which exceeds that of the elastically deformable arm, extending in a substantially tangential direction relative to a circumference of the damper assembly, and engaged with circumferential play in a first direction of rotation of the damper in a housing in one of said parts and engaged without circumferential play in a housing in the other of said parts, the drive means on one of the support members of the elastically deformable arm comprising at least one radial finger in the path of movement of the drive spring, on the trailing side thereof in said first direction of rotation.

Thus the elastically deformable arm acts over only a first part of relative angular movement between the rotating parts and is systematically rendered inoperative at the end of this first range of relative angular movement, thereafter remaining stressed to the same degree as at the end of this first range of relative angular movement, being subject to no further stress thereafter.

After absorbing the circumferential play associated with the drive spring said one support member of the elastically deformable arm is engaged by its radial finger and the drive spring with that of the rotating parts to which the other of the support members of the elastically deformable arm is already engaged so as to rotate therewith.

Being thus rendered inoperative, the elastically deformable arm is lodged between the rotating parts during subsequent relative angular movement therebetween, which constitutes a further advantage in that this elastically deformable arm constitutes the elastic means which are of low stiffness and relatively fragile.

In accordance with the invention, the rendering of the elastically deformable arm inoperative does not require the intervention of any parts other than those already involved in the construction of the torsional damper, so that it is achieved at minimum cost.

Moreover, this arrangement does not require further openings to be formed in the rotating parts.

Finally, it offers the further advantage of involving the action of elastic means only, so that there is no likelihood of any bruising of parts.

The support members of the elastically deformable arm may be of any configuration. They may, for example, consist of rings which are continuous in the circumferential direction or slotted to a greater or lesser extent.

The thickness of the plate from which the elastically deformable arm is cut out is selected according to the torque to be transmitted. For a given configuration there is a given distribution of stresses and, all other conditions being equal, the torque which can be transmitted depends only on this thickness.

The same die may, however, be used for cutting out plates of varying thicknesses.

Other objects and advantages will appear from the following description of an example of the invention, when considered in connection with the accompanying drawings, and the novel features will be particularly pointed out in the appended claims.

IN THE DRAWINGS

FIG. 15 is a partial view in elevation as seen on the arrow XIV in FIG. 13.

DESCRIPTION OF THE PREFERRED EMBODIMENTS

In the drawings, the torsional damper to which the invention is applied constitutes, by way of an example, a friction clutch plate with a damper-type hub.

In the embodiment shown in FIGS. 1 to 5 the friction clutch plate comprises two coaxial parts, a driving part A and a driven part B, mounted so as to rotate relative to one another within a defined range of relative angular movement and against the action of elastic means acting circumferentially and disposed between them, these elastic means being hereinafter referred to as circumferentially acting elastic means.

Figure 1:
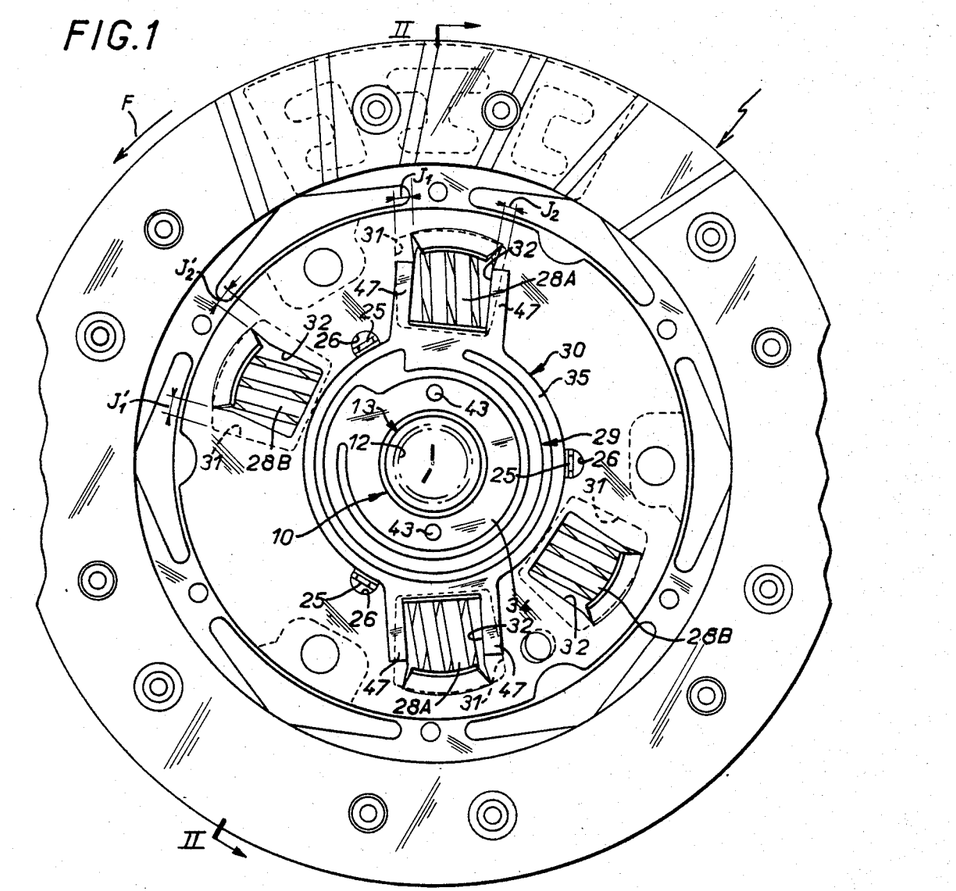
FIG. 1 is a partial view in elevation of a torsional damper in accordance with the invention.
Figures 2, 3, 4, 6, 7, 8:
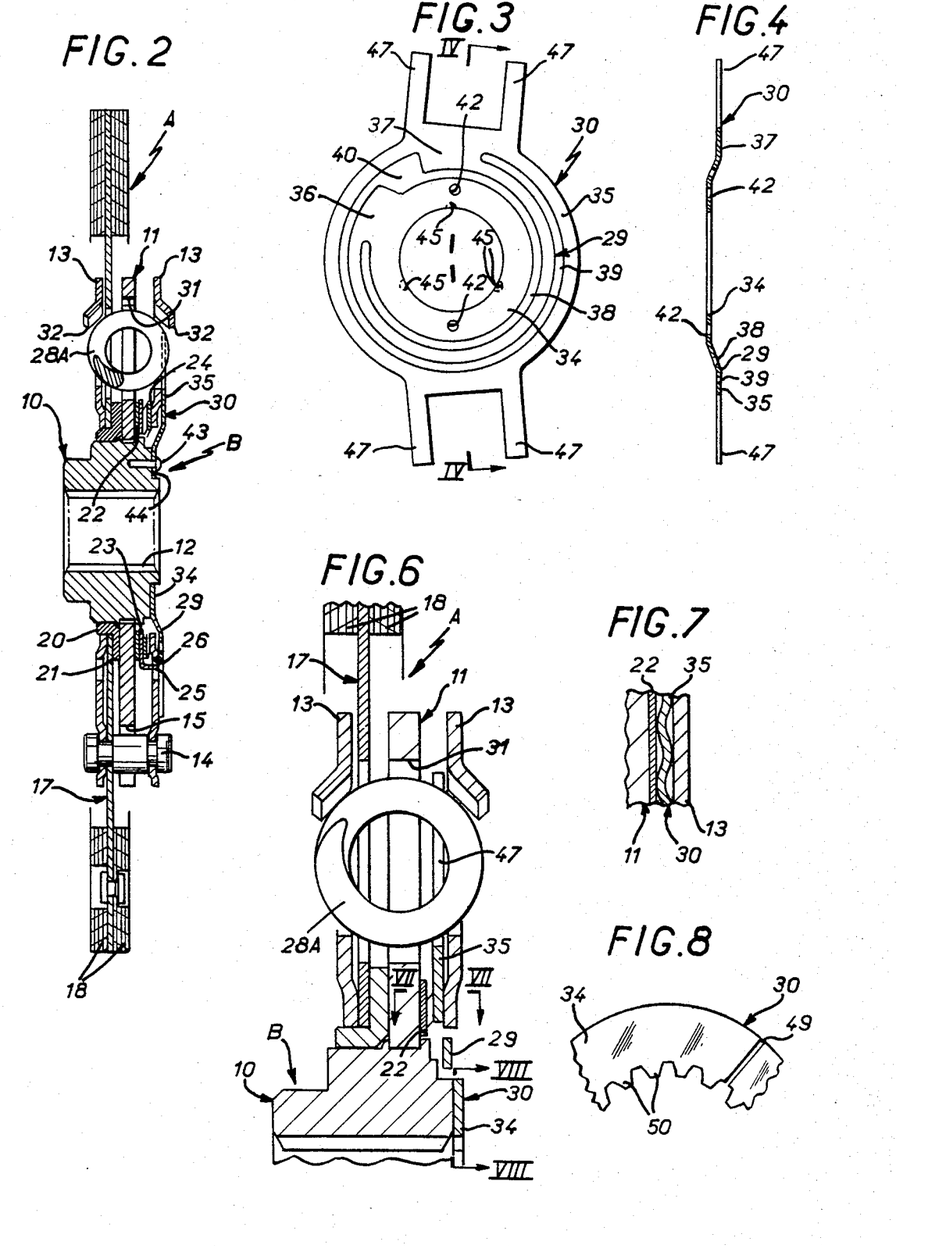
FIG. 2 is an axial cross-section on the line II—II in FIG. 1.
FIG. 3 is a view in elevation of the plate incorporating the elastically deformable arm constituting part of the torsional damper.
FIG. 4 is an axial cross-section on the line IV—IV in FIG. 3.
FIG. 6 is a partial view, analogous to that of FIG. 2, to a larger scale and showing an alternative embodiment.
FIG. 7 is a partial circumferential cross-section, shown developed onto a flat surface, on the line VII—VII in FIG. 6.
FIG. 8 is a partial transverse cross-section on the line VIII—VIII in FIG. 6.

The driven part B comprises a hub 10 and a disk 11 extending transversely around hub 10 and rigidly attached thereto.

Hub 10 engages on a shaft (not shown), in practice a driven shaft and the gearbox input shaft in the case of a friction clutch for an automotive vehicle.

In the embodiment shown, the inner perimeter of hub 10 is formed with splines 12 which key it against rotation on the aforementioned shaft.

The driving part A comprises two disks 13, hereinafter referred to as guide disks, extending transversely around hub 10 and one on each side of and spaced from disk 11. They are attached together by means of axial spacers 14 which pass with clearance through notches 15 formed for this purpose in the periphery of disk 11.

There are three such axial spacers 14 in the embodiment shown.

The driving part A also comprises a friction disk 17 which is attached to guide rings 13 by the axial spacers 14 which in the embodiment shown attach together guide rings 13. Around the perimeter on each side of friction disk 17 is a respective friction lining 18.

A friction disk of this type is intended to be clamped between two plates keyed against rotation to a second shaft, in practice a driving shaft and the motor output shaft in the case of a friction clutch for an automotive vehicle.

In the embodiment shown friction disk 17 lies against one of guide rings 13 and, between the perimeter of the resulting assembly and hub 10 there is disposed a bearing 20 attached to which is a radial collar 21 inserted axially between the aforementioned assembly and disk 11.

Between the rotating parts A and B thus constituted there are provided friction means with which are associated axially acting elastic clamping means.

In the embodiment shown, the aforementioned friction means comprise a friction ring 22 carried on a support ring 23 and applied against disk 11 on the opposite side of radial collar 21 of bearing 20. The associated axially acting elastic clamping means comprise an "ON-DUFLEX" type annular spring 24 which bears on the corresponding guide ring 13 to urge support ring 23 towards disk 11.

Axial lugs 25 on support ring 23 engage in notches 26 in the guide ring 13 on the side on which it is located, so that it rotates therewith.

The circumferentially acting elastic means disposed between rotating parts A and B comprise helical springs 28A, 28B and an elastically deformable arm 29 which is cut out from a thin plate 30.

Springs 28A, 28B extend in a substantially tangential direction relative to a circumference of the damper assembly and each is housed partly in openings provided for this purpose in rotating part B, in the form of windows 31 in disk 11, and partly in openings formed for this purpose in rotating part A, in the form of windows 32 in guide rings 13.

In practice, the circumferential extent of windows 31 in disk 11 is greater than that of windows 32 in guide rings 13, so that in the rest configuration of the damper assembly, as shown in FIG. 1, there is circumferential play between each end of springs 28A, 28B and the corresponding radial edge of the window 31 in which the spring 28A or 28B is located.

For the direction of rotation shown by arrow F in FIG. 1, this play, as measured in the circumferential direction, has a value J1 for springs 28A, which are disposed at substantially diametrically opposed positions, and a higher value J'1 in the case of springs 28B, also arranged substantially diametrically opposed, and alternating with springs 28A.

For the direction of rotation opposite that shown by arrow F, this play, as measured in the circumferential direction, has a value J2 which is less than play J1 in the case of springs 28A and value J'2 which is greater than play J2 in the case of springs 28B.

These arrangements are given here by way of example only and are known per se. As they do not form part of the present invention they will not be described in further detail here.

In accordance with the invention, the elastically deformable arm 29 extends between two support members 34, 35, with at least one of which it is integral, via a root area.

In the embodiment shown in FIGS. 1 to 5 support members 34, 35 form two concentric support rings and will be so designated hereinafter. There is thus an inner support ring 34 and an outer support ring 35, cut out from plate 30 in the same way as elastically deformable arm 29, so that the latter is integral with each of support rings 34 and 35 through respective root areas 36, 37, at the outer periphery of the inner support ring 34 and at the inner periphery of the outer support ring 35. In both cases the root area is radial, that is to say it extends in a substantially radial direction relative to the axis of the damper assembly.

The elastically deformable arm 29 preferably subtends an angle of more than 180°, in order to confer the required degree of elasticity.

In practice and in the embodiment shown in FIGS. 1 to 5 it subtends an angle slightly less than 360°, the root areas 36, 37 on support rings 34, 35 being relatively close together as measured in the circumferential direction.

Over at least part of its length, and in practice over its entire length, elastically deformable arm 29 extends circumferentially alongside inner support ring 34, being separated therefrom by a slot 38. Likewise, it extends circumferentially alongside outer support ring 35, being separated from it by a slot 39. Like elastically deformable arm 29, each of slots 38, 39 extends over slightly less than 360°. Slots 38, 39 are continuous with one another through the opening 40 separating root areas 36, 37 of elastically deformable arm 29.

In the embodiment shown, the elastically deformable arm 29 and the slots 38, 39 bordering it are, like support rings 34, 35, substantially circular in shape.

This is not necessarily the case, however.

Inner support ring 34 may be positively engaged on one of rotating parts A, B so as to rotate therewith.

In the embodiment shown, it is therefore formed at two diametrically opposed positions with apertures 42 permitting the passage of pins 43 or analogous devices by means of which it engages hub 10 of rotating part B so as to rotate therewith, being maintained against a transverse shoulder 44 on hub 10, as shown in FIG. 2.

In an alternative arrangement shown in dashed line in FIG. 3 inner support ring 34 has notches 45 in its internal periphery, into which the material of hub 10 may be caused to extend by means of a stamping operation, so as to attach ring 34 to hub 10 so as to rotate therewith.

This arrangement facilitates adjustment of the rest configuration of the damper assembly during manufacture, through the facility for selecting an appropriate angular position of hub 10.

Outer support ring 35 is provided with drive means for engaging it with the other of rotating parts A, B, in practice part A in the embodiment shown, so as to rotate therewith over at least part of the defined a range of angular movement between rotating parts A and B.

In the embodiment shown in FIGS. 1 to 5, the drive means carried by outer support ring 35 comprise at least one radial finger 47 disposed on the path of one of springs 28A, 28B, on the "trailing" side of the latter as seen in the relevant direction of rotation of the damper assembly.

This is spring 28A in the embodiment shown, hereinafter referred to as the drive spring.

In practice and in this embodiment radial finger 47 of support ring 35 is, in the rest configuration of the damper assembly, in contact with the "trailing" end of drive spring 28A as seen in the relevant direction of rotation.

In practice and in this embodiment outer support ring 35 has substantially diametrally opposed pairs of radial fingers 47 by means of which it engages without circumferential play on drive springs 28A.

As will be seen from the drawings, in the embodiment shown in FIGS. 1 to 5 the plate 30 from which are cut out elastically deformable arm 29, support rings 34, 35 and radial fingers 47 lies entirely outside the volume defined between guide rings 31, on the side of the latter opposite friction disk 17. Thus it may be readily fitted to an existing friction clutch, without modification to the overall structure of the latter, and without substantially increasing its dimension in the axial direction.

The same applies if it is instead placed on the same side as friction disk 17.

It will also be seen from the drawings that in this embodiment support rings 34, 35 are axially offset relative to one another.

In practice the stiffness of elastically deformable arm 29 is less than that of each individual spring 28A, 28B.

Further, the stiffness of each spring 28B is in practice greater than that of each spring 28A.

When the direction of rotation is as shown by arrow F in FIG. 1, an increasing torque is applied to part A and initially transmitted to part B only through elastically deformable arm 29.

Support ring 35 to which elastically deformable arm 29 is united at one end is itself engaged, by radial fingers 47, with drive springs 28A, and thus with guide rings 13 of driving part A, so as to rotate therewith. In view of the stiffness of springs 28A, only elastically deformable arm 29 gives.

Figure 5:
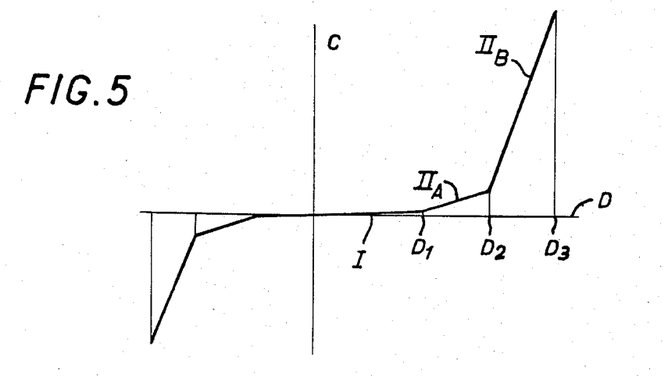
FIG. 5 is a diagram illustrating the operation of the torsional damper in accordance with the invention.

FIG. 5 is a diagram plotting the relative angular movement D between rotating parts A and B along the abscissae as a function of the torque C transmitted from one part to the other along the ordinates. This first stage of operation is represented by the straight line I passing through the origin and with a slope proportional to the stiffness of elastically deformable arm 29.

This first phase of operation continues until, at a value D1 of relative angular movement, circumferential play J1 is absorbed.

At this point drive springs 28A begin to act.

Their respective trailing ends (relative to the direction of rotation concerned) engage the corresponding radial edges of windows 31 in disk 11 in which they are housed, aligning with this radial edge of windows 31 the leading edge of corresponding radial fingers 47 of support ring 35, so that they cease to drive radial fingers 47 circumferentially in this same direction.

Support ring 35 is thus immobilized relative to disk 11 in this embodiment.

In other words, subsequent operation occurs as if support ring 35 of elastically deformable arm 29 were keyed against rotation relative to disk 11 and thus rotating part B of which it forms part.

Thus from the time at which the relative angular movement D reaches the value D1 marking the start of a second phase of operation, elastically deformable arm 29 is inoperative insofar as support rings 34, 35 are both constrained to rotate with the same rotating part B. It therefore remains in the stressed state applying at relative angular movement D1, without subsequently being subjected to any additional stress.

This second phase of operation is represented by straight line IIA, continuous with the aforementioned straight line I and with a slope proportional to the stiffness of drive springs 28A only.

This second phase of operation continues until, at a value D2 of relative angular movement between parts A and B, the play J'1 associated with springs 28B is in turn absorbed, so that springs 28B then begin to act.

This third phase of operation is represented by straight line IIB which is continuous with the aforementioned straight line IIA and has a slope proportional to the cumulative stiffness of springs 28A and 28B.

This third phase of operation continues until the final value of relative angular movement D3 is reached, at which driven part B is direct driven by driving part A, either because springs 28A, 28B are then fully compressed, or because axial spacers 14 then come into contact with the corresponding radial edges of notches 15 in disk 11 through which they pass.

As previously indicated, throughout the range of relative angular movement corresponding to the action of drive springs 28A first then the combination of springs 28A, 28B, elastically deformable arm 29 is inoperative.

When the torque between parts A and B is decreasing a process which is the reverse of that described occurs, springs 28A returning outer support ring 35 to its initial position by means of the radial fingers 47 thereon which are now those "trailing" relative to the new direction of rotation.

Thus elastically deformable arm 29 of plate 30 constitutes a first damping stage, of relatively low stiffness, for relatively low values of torque. Springs 28A, 28B constitute a second damping stage, of relatively high stiffness, for relatively high values of torque.

This arm may thus be substituted with advantage for the springs usually employed to constitute such a first damping stage, providing additional space for a further damping stage, if required, and also increasing the overall capacity of the device without increasing its dimensions.

FIG. 5 does not show hysteresis effects associated with friction ring 22, by virtue of which there is, for the same value of relative angular movement, a difference between the value of torque when the torque is increasing and the value of torque when the torque is decreasing.

In the embodiment shown in FIGS. 1 to 5, these hysteresis effects occur throughout the range of relative angular movement between rotating parts A and B.

This does not apply to the embodiment shown in FIGS. 6 to 8.

In this embodiment and in accordance with the invention outer support ring 35 and radial fingers 47 which form part of it lie within the volume defined by guide rings 13, between one of these guide rings and disk 11. The outer support ring 35 itself constitutes the axially acting elastic clamping means associated with friction disk 22, replacing the previously specified axially acting spring 24.

By way of example, and as shown in FIGS. 6 and 7, outer support ring 35 is circumferentially corrugated, like axially acting spring 24.

Like the aforementioned axially acting spring 24 and instead of it outer support ring 35 brings friction ring 22 into play in a uniform manner throughout the range of relative angular movement between rotating parts A and B, both during operation of the first damping stage formed by elastically deformable arm 29 and during operation of the second damping stage formed by springs 28A, 28B.

In this embodiment, inner support ring 34 is split by a radial slot 49 (FIG. 8) and its internal perimeter has a shape analogous to that of the internal perimeter of hub 10, so that it may be mounted on the same shaft as the latter and therefore keyed against rotation relative to hub 10.

In the embodiment shown hub 10 comprises splines 12 which engage on the aforementioned shaft, so that the internal periphery of inner support ring 34 comprises teeth 50 with the same transverse profile as splines 12.

By virtue of slot 49 it has sufficient elasticity to engage without play on the shaft on which hub 10 is also engaged.

Thus in this embodiment outer support ring 34 is keyed against rotation relative to hub 10 by this shaft (not shown in the drawings).

There is no other means used to couple together support ring 34 and hub 10.

Figure 9:
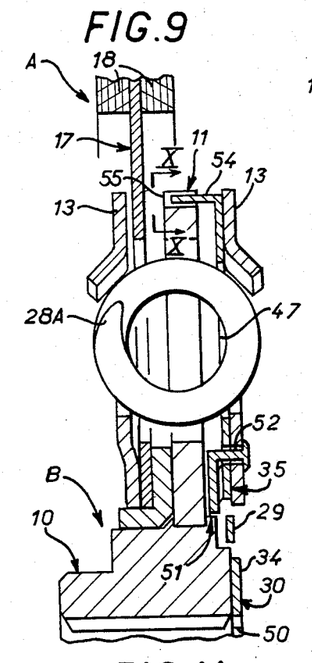
FIG. 9 is a view analogous to that of FIG. 6 and relating to a further embodiment.
Figure 10:
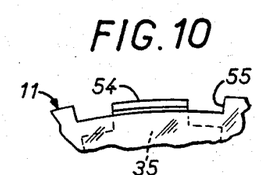
FIG. 10 is a partial transverse cross-section on the line X—X in FIG. 9.

In the embodiment shown in FIGS. 9 and 10 outer support ring 35 is again corrugated so as to constitute an axially acting annular spring of the "ONDUFLEX" type.

The resulting axially acting annular spring acts between the relevant guide ring 13 and a friction ring 51 which is keyed against rotation relative to guide ring 13 by means of axial lugs 52 which pass with clearance through outer support ring 35 and without clearance through guide ring 13, to which they are riveted (FIG. 9).

Thus the hysteresis effects due to friction ring 51 develop only if there is relative angular movement between outer support ring 35 and guide ring 13 against which the latter is applied.

In other words, in this embodiment hysteresis effects occur only during action of the second damping stage formed by springs 28A, 28B.

There is no friction ring associated with the first damping stage formed by elastically deformable arm 29, so that no hysteresis effects occur during the action of the latter.

To return it to its initial position after rotation relative to guide ring 13, outer support ring 35 is formed with an axial lug 54 beyond its radial fingers 47, engaging with play in a notch 55 formed for this purpose in the perimeter of disk 11.

Figure 11:
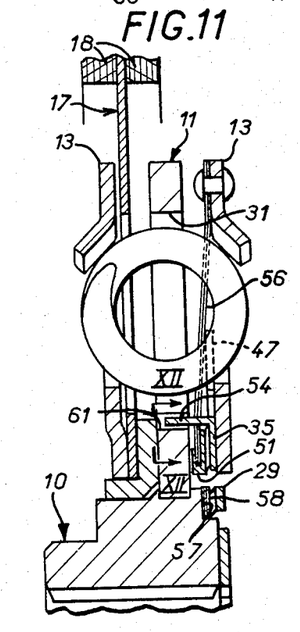
FIG. 11 is a view analogous to that of FIG. 6 and relating to a further embodiment.
Figure 12:
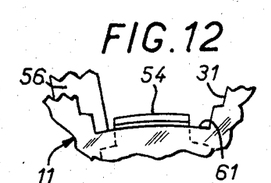
FIG. 12 is a partial transverse cross-section on the line XII—XII in FIG. 11.

In the embodiment shown in FIGS. 11 and 12 outer support ring 35 again constitutes an axially acting annular spring, but in this case friction disk 51 with which it cooperates is supported on radial arms 56 from the perimeter of the respective guide ring 13.

Axial lugs 54 on support ring 35 engage with play in radial extensions 61 of windows 31 in disk 11.

In this embodiment, elastically deformable arm 29 constitutes the axially acting elastic clamping means, to this end being formed with circumferential corrugations like outer support ring 35.

It is thus used to apply a friction ring 58 against a shoulder 57 on hub 10 when there is relative angular movement between elastically deformable arm 29 and hub 10, so that hysteresis effects occur throughout the operation of the first damping stage formed by elastically deformable arm 29.

As previously, the corrugations in outer support ring 35 subsequently ensure that hysteresis effects are generated on intervention of the second damping stage formed by springs 28A, 28B.

These effects may with advantage and if required be made different from those occurring during intervention of the first damping stage formed by elastically deformable arm 29, which are different in origin.

The same result may be obtained by means of radial arms 56 if, instead of there being corrugations in outer support ring 35, these radial arms 56 are elastic and urge outer support ring 35 towards guide ring 13 with which it is in contact.

In all these cases radial fingers 47 of outer support ring 35, engaged with springs 28A as previously, return outer support ring 35 to its initial position on return of the damper assembly to its rest configuration.

In the foregoing description it has been assumed that disk 11 is attached to hub 10, so that the friction clutch comprises only two rotating parts A and B.

As shown in FIGS. 13 to 17, however, the invention is also applicable to the case in which disk 11 is rotatable relative to hub 10, within defined limits (not shown in the figures), the friction clutch then comprising three coaxial parts rotating relative to one another in pairs. These comprise part A, constituted as previously by a friction disk 17 and guide rings 13, one of the latter possibly forming the disk of the friction clutch, as shown, an intermediate part C formed in practice by disk 11, and a part B formed, in this case, by hub 10 only.

In this case part C constitutes a driving part and part B remains the driven part.

In accordance with the invention the circumferentially acting elastic means interposed between driving part C and driven part B are, as previously, in the form of an elastically deformable arm 29 extending between two support members which form, in this embodiment, an internal ring 34 and an external ring 35, the elastically deformable arm being integral with at least one of said rings and, in the embodiment shown, with both of said rings, by virtue of respective radially extending root areas.

As previously, inner support ring 34 may be positively engaged with driven part B, in practice hub 10, so as to rotate therewith and in the embodiment shown its internal perimeter is to this end formed to a substantially polygonal profile complementing a bearing surface 59 on hub 10 (FIG. 15).

Conjointly, outer support ring 35 is fitted with drive means for engaging it with driving part C, in practice disk 11, so as to rotate therewith for the whole range of relative angular movement between driving part C and driven part B.

To this end, in the embodiment shown outer support ring 35 has at its periphery axial lugs 60 each of which engages without play in a radial extension 61 of a window 31 in disk 11, each lug being folded back radially towards the axis of the damper assembly, at a point beyond the aforementioned radial extension 61, so as to retain the plate 30 in the axial direction.

Figure 13:
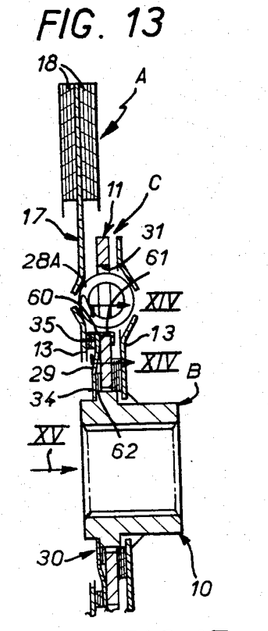
FIG. 13 is a partial view analogous to that of FIG. 2 and concerning a further embodiment.
Figure 14:
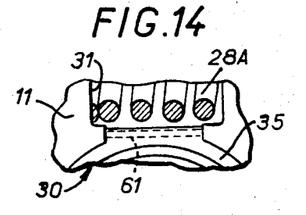
FIG. 14 is a partial transverse cross-section to a larger scale on the line XIV—XIV in FIG. 13.
Figures 16, 17:
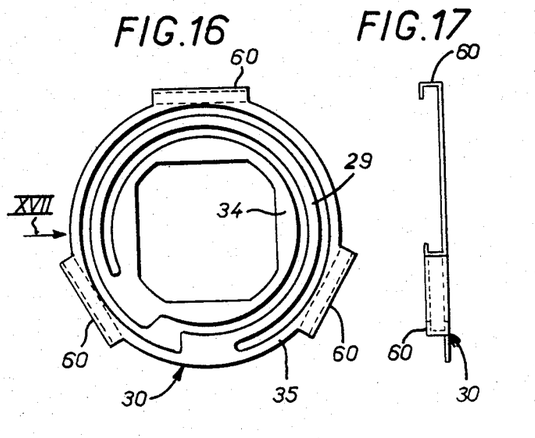
FIG. 16 is a view in elevation of the plate incorporating the elastically deformable arm used in the embodiment shown in FIGS. 13 to 15.
FIG. 17 is a side view as seen on arrow XVII in FIG. 16.

As previously, a friction ring 62 may be placed between, for example, disk 11 and inner support ring 34, which rotates with hub 10.

It will be seen that in this embodiment plate 30 used in accordance with the invention provides a floating mounting of disk 11. In conjunction with springs 28A, 28B it provides a floating mounting of friction disk 17 relative to hub 10, in the radial, circumferential and axial directions, constituting a very simple means of reducing the consequences of any misalignment between the driving and driven shafts.

In other words, it thus provides a centering action.

Figure 18:
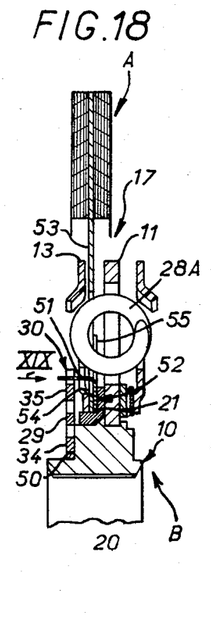
FIG. 18 is a partial axial cross-section, analogous to that of FIG. 2, and concerning a further embodiment of the torsional damper in accordance with the invention.
Figure 19:
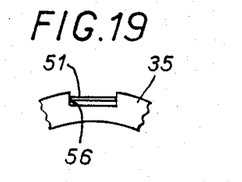
FIG. 19 is a partial view in elevation on the arrow XIX in FIG. 18.

In the embodiment shown in FIGS. 18 and 19 plate 30 from which elastically deformable arm 29 is cut is disposed outside the volume defined by guide rings 13, on the side of friction disk 17.

Inner support ring 34 is applied transversely against a shoulder 50 on hub 10 and, as previously, is constrained to rotate with hub 10 of rotating part B.

In this arrangement, however, the drive means associated with outer support ring 35 to cause it to rotate with rotating part A for at least part of the aforementioned range of relative angular movement comprise axial lug 51 linking it without circumferential play to friction ring 52 inserted axially between radial collar 21 of bearing 20 and disk 53 of friction disk 17, axial lug 51 passing axially through the adjacent guide ring 13, by means of an opening 54 in the latter, with sufficient circumferential play so as to never come into contact with this guide ring 13 during relative angular movement.

In practice, friction ring 52 is designed to act conjointly with at least part of the second damping stage.

For example, and as shown in the drawings, it incorporates radial fingers 55 by means of which it engages on springs 28A of this second damping stage, so as to act conjointly therewith.

It may also, and in a manner known per se, feature an axial lug engaged with play in an opening in disk 11 so as to cooperate also with springs 28B (not visible in the figures).

Whichever arrangement is adopted, it is thus constrained to rotate with rotating part A for a defined range of relative angular movement.

For preference and as shown in the Figures, axial lug 51 linking friction ring 52 to outer support ring 35 of elastically deformable arm 29 is integral with friction ring 52 and engaged without circumferential play in a notch 56 formed for this purpose in the outer periphery of outer support ring 35 (FIG. 19).

This considerably simplifies the configuration of plate 30.

The term "friction ring" used in the foregoing description is intended to cover both a single ring and a support ring with a friction coating.

It will be seen that in all embodiments described so far elastically deformable arm 29 is operative irrespective of the direction of rotation.

Its effects are identical for both directions of rotation except in the case where it has circumferential corrugations so as to also constitute an axially acting annular spring.

In this case the corrugations tend to progressively open out and thus exert a reduced effect as the torque transmitted increases. They progressively close up and so exert an increased effect as the torque transmitted decreases, however. In the other cases described in relation to the previously defined embodiments, if radial fingers 47 of outer support ring 35 are not rigorously disposed in pairs which are diametrically opposed for reasons of adaptation to the geometric configuration of the assembly, then the stresses are symmetrically distributed in elastically deformable arm 29 for the two directions of rotation.

It happens that, for some applications at least, a lack of symmetry in this respect is beneficial.

This is the case with friction clutches for automotive vehicles in particular.

This type of friction clutch is placed between a driving shaft, the motor output shaft, and a driven shaft, the gearbox input shaft. The motor output shaft is subject to cyclic oscillation of moderate amplitude associated with the top dead center position. This must be damped out.

Due to internal friction in the gearbox, there is an opposing torque.

As a result, the rest configuration in service (the dynamic zero point) is offset angularly relative to the rest configuration when the clutch is isolated (the static zero point).

In other words, when the clutch is in service and for a given total relative angular movement, the angular movement of the clutch relative to its rest configuration is larger in one direction, corresponding to an increasing torque, to that in the opposite direction, corresponding to a decreasing torque.

Figure 20:
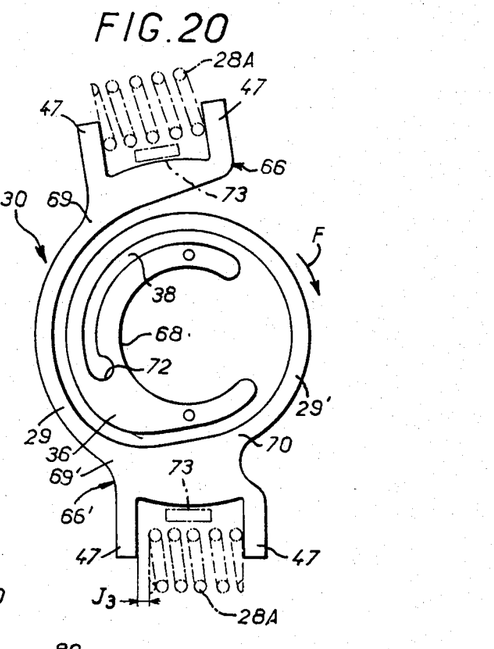
FIG. 20 is a view in elevation analogous to that of FIG. 3 and concerning a further embodiment.

FIG. 20 shows an embodiment of the invention which is particularly suited to this application.

In this embodiment two elastically deformable arms are arranged circumferentially end to end, with a common support member.

Firstly, in the direction from the outside towards the inside, elastically deformable arm 29 extends between support members 66, 66'. It is followed by elastically deformable arm 29' which is continuous with it and extends between support member 66' and a support member 68, in the form of a spiral which turns back on itself.

In the embodiment shown, each of support members 66, 66' is in the form of a fork formed by two radial fingers 47, to permit it to engage, as previously, on springs 28A of the second damping stage, as shown schematically in dashed line in FIG. 20, said springs 28A acting as drive springs.

While support member 66 is engaged on the corresponding spring 28A without circumferential play, the same does not apply to support member 66' and its associated spring 28A.

For the latter, engagement on spring 28A is without circumferential play at the leading end of spring 28A for the direction of rotation of the assembly corresponding to increasing torque as shown by arrow F in FIG. 20 and with a circumferential play J3 at the other end of spring 28A, which is the trailing end in the direction of rotation in question.

For reasons which will be explained later, the outer edge of support members 66, 66', between radial fingers 47, is circular in shape.

Elastically deformable arm 29 is integral with support members 66, 66' by virtue of root areas 69, 69' which, in the embodiment shown, extend substantially circumferentially and are continuous with elastically deformable arm 29.

Similarly, elastically deformable arm 29' is integral with support member 66' through root area 70 which extends substantially circumferentially and is continuous with elastically deformable arm 29'. It is also integral with support member 68, but here the root area 36 extends radially, as previously.

Support member 68 is, as previously, constrained to rotate with hub 10 of part B. It may have any suitable configuration.

It is not necessarily in the form of a ring.

In the embodiment shown, it constitutes only part of a ring, for example.

As previously, the entire assembly is cut out from a common plate 30.

For improved distribution of stresses, circumferential slot 38 separating elastically deformable arm 29' from support member 68 is widened at its closed end to form a substantially circular opening 72 which is slightly offset towards the axis of the damper assembly.

In operation of a torsional damper fitted with a plate of this kind with the torque increasing, only support member 66 is initially driven by part A, as shown by arrow F in FIG. 20.

Due to the circumferential play J3 in the rest configuration between spring 28A and radial finger 47 in the trailing direction relative to the direction of rotation in question, support member 66' is not subject to any force exerted by spring 28A during this first phase of operation.

Thus during this first phase of operation elastically deformable arms 29 and 29' are conjointly stressed, in series with one another, between support member 66 and support member 68.

This first phase of operation continues until circumferential play J3 has been absorbed.

From this time support member 66' is in turn subjected to a driving force by corresponding spring 28A.

Although still bent and continuing to exert an action in addition to that of elastically deformable arm 29', elastically deformable arm 29 is not stressed further, as it extends between two support members 66, 66' conjointly driven by rotating part A.

For operation of the torsional damper with the torque decreasing, however, only elastically deformable arm 29' between support members 66' and 68 exerts any action.

For operation of the damper assembly with the torque decreasing support members 66, 66' are driven from the outset by rotating part A and so elastically deformable arm 29 is freed from stress from the outset.

In this embodiment, by virtue of the circular profile of the edge between fingers 47 of support members 66, 66', plate 30 offers the benefit of centering one of the rotating parts, part A in the case of a torsional damper of the type previously described.

To this end and as shown schematically in dashed line in FIG. 20, it sufficient for rotating part A to comprise at least two axial centering lugs 73, engaged between radial fingers 47 on support members 66, 66', as shown in the drawings.

Support members 66, 66' then form bearing areas of circular profile for these centering lugs 73, permitting rotation of part A.

These axial centering lugs 73 on rotating part A may be integral with guide ring 13, being constituted by part of the lip formed on forming the window in the guide ring in which the corresponding spring 28A is engaged.

Thanks to this centering arrangement, which may prove necessary if that provided by springs 28A, 28B alone is insufficient, which is usually the case due to the circumferential and radial plays involved, there may with advantage be no friction or play at bearing 20.

In the embodiment shown in FIG. 20 the root areas 69, 69' through which elastically deformable arm 29 is integral with support members 66, 66' extend circumferentially.

This is not necessarily the case.

Figure 21:
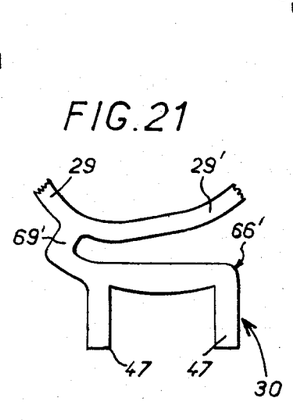
FIG. 21 is a variation in part of FIG. 20 relating to a further embodiment.

As shown in FIG. 21, for example, in the case of root area 69', these root areas may extend radially.

Note that in this case the root area is circumferentially offset relative to the drive means associated with the corresponding support member, in this case radial fingers 47.

This arrangement can be advantageous in certain applications at least, in particular with regard to the distribution of stresses in plate 30.

Where there is no circumferential offset, as in the previously described embodiments, the root area of an elastically deformable arm is radially aligned with the drive means associated with the corresponding support member.

Figure 22:
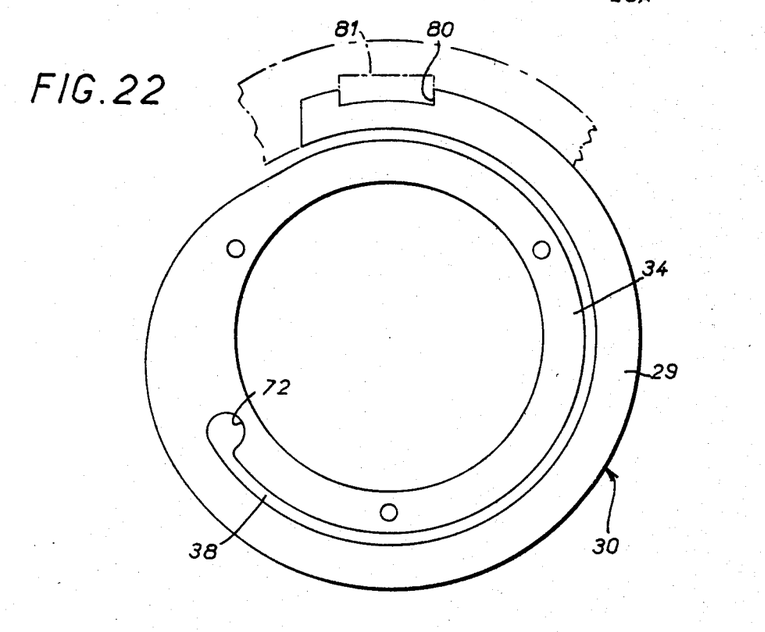
FIG. 22 is a view in elevation analogous to that of FIG. 3 and concerning a further embodiment.

FIG. 22 shows an alternative embodiment using a single elastically deformable arm 29, integral with a support member at one end only.

In this embodiment, elastically deformable arm 29 extends circumferentially around inner support ring 34, separated from it by slot 38, the closed end of which is widened to constitute an opening 72 of circular profile offset in the radial direction.

At its other end on its external periphery elastically deformable arm 29 has a notch 80 by means of which, as shown schematically in dashed outline, it may engage with a support member 81 attached to one of the rotating parts.

This embodiment is particularly suited to torsional dampers comprising three rotating parts A, B and C as described with reference to FIGS. 13 to 17, especially in the case of a friction clutch intended for a commercial vehicle.

Elastically deformable arm 29 in accordance with the invention may then be used between parts B and C, for example, support member 34 being positively engaged with hub 10 of part B so as to rotate therewith, as previously, whereas support member 81 is formed by a lug projecting axially from disk 11 of part C and constituting the drive means for engaging it with part C so as to rotate therewith.

It will be understood that various changes in the details, materials and arrangements of parts, which have been herein described and illustrated in order to explain the nature of the invention, may be made by those skilled in the art within the principle and scope of the invention as expressed in the appended claims.

For example, the drive means associated with a support member of an elastically deformable arm may be unidirectional so as to act only in one direction of rotation of the damper assembly.

Alternatively, where these drive means comprise radial fingers there may be one on a first side for a first rotation direction and a second on a second side and substantially diametrically opposed to the first for the other direction of rotation.

The present invention is not limited to the case where there is only one plate 30.

On the contrary, two or more plates 30 may be used in association.

There might be, for example, an association of plates 30 merely juxtaposed, with corresponding elastically deformable arms operating in parallel.

In such a case, plates 30 are preferably arranged head-to-tail in pairs with one plate 30 of each pair turned through 180° relative to the other plate 30 of that pair, to prevent displacement of the center of the damper assembly in operation as a result of deformation of the corresponding elastically deformable arms, in spite of the fact that this displacement is of very small amplitude should this precaution be omitted.

It is also possible to have plates 30 associated in such a way that corresponding elastically deformable arms are in series with one another.

In this case, and considering the example of an association of such plates in pairs, if the inner support member of one of these plates is constrained to rotate with a first of the rotating parts, the outer support member of the other of said plates is, for example, constrained to rotate with the other of said rotating parts, the outer support member of the first of said plates being rigidly coupled to the inner support member of the second.

As an alternative, the two plates might have their inner or outer support members attached to one another with the inner or outer support member of one plate attached to a first of the rotating parts and with the other attached to the other of said rotating parts.

I claim:

1. A torsional damper suitable for use in a friction clutch plate, comprising at least two coaxial parts mounted to rotate relative to each other within a defined range of relative angular movement, circumferentially acting elastic means between said parts resisting such relative angular movement and incorporating at least one elastically deformable arm of thin plate configuration, two support members between which said elastically deformable arm extends and with at least one of which it is integral via a root area, means for positively engaging one of said support members with one of said parts so as to rotate therewith, and drive means on the other of said support members for engaging it for rotation with the other of said parts for at least part of said defined range of relative angular movement, wherein a first of said parts includes a hub designed to engage on a shaft so as to rotate therewith and a first of said support members is in the form of a slotted ring with an internal profile analogous to that of said hub so as to engage on the aforementioned shaft so as to rotate therewith, whereby said first support member is engaged with said first part so as to rotate therewith via the aforementioned shaft.

2. A torsional damper suitable for use in a friction clutch plate, comprising at least two coaxial parts mounted to rotate relative to each other within a defined range of relative angular movement, circumferentially acting elastic means between said parts resisting such relative angular movement and incorporating at least one elastically deformable arm of thin plate configuration, two support members between which said elastically deformable arm extends and with at least one of which it is integral via a root area, means for positively engaging one of said support members with one of said parts so as to rotate therewith, and drive means on the other of said support members for engaging it for rotation with the other of said parts for at least part of said defined range of relative angular movement, wherein said circumferentially acting elastic means comprise at least one drive spring, the stiffness of which exceeds that of said elastically deformable arm, extending in a substantially tangential direction relative to a circumference of the damper, and engaged with circumferential play in a first direction of rotation of the damper in a housing in one of said parts and engaged without circumferential play in a housing in the other of said parts, the drive means on the other of said support members of said elastically deformable arm comprising at least one radial finger in the path of movement of said drive spring, on the trailing side thereof in said first direction of rotation.

3. A torsional damper according to claim 2, wherein said elastically deformable arm subtends an angle of more than 180°.

4. A torsional damper according to claim 3, wherein said elastically deformable arm subtends an angle of slightly less than 360°.

5. A torsional damper according to claim 2, wherein said support members are offset relative to one another in the axial direction.

6. A torsional damper according to claim 2, wherein said radial finger is in contact with the corresponding end of said drive spring when the damper is in a rest configuration.

7. A torsional damper according to claim 2, wherein said other of said support members incorporates at least one pair of radial fingers by virtue of which it is engaged on said drive spring.

8. A torsional damper according to claim 7, wherein said radial fingers are engaged on said drive spring with no play at one end thereof at least.

9. A torsional damper according to claim 7, wherein said radial fingers are engaged on said drive spring with no play at either end thereof.

10. A torsional damper according to claim 7, wherein in a rest configuration of the damper said one of said support members is engaged on said drive spring with no circumferential play at one end and with circumferential play at the other end.

11. A torsional damper according to claim 7, comprising at least two drive springs and wherein said one of said support members comprises two pairs of radial fingers, each pair being engaged on a respective drive spring.

12. A torsional damper according to claim 2, comprising two elastically deformable arms arranged end to end in the circumferential direction, and a common support member for said two elastically deformable arms.

13. A torsional damper according to claim 2, further comprising, between said parts, friction means and axially acting elastic clamping means associated therewith formed by said elastically deformable arm.

14. A torsional damper according to claim 13, wherein said support member and/or said elastically deformable arm is or are formed with circumferential corrugations.

15. A torsional damper suitable for use in a friction clutch plate, comprising at least two coaxial parts mounted to rotate relative to one another within a defined range of relative angular movement, circumferentially acting elastic means between said parts resisting such relative angular movement and incorporating at least one elastically deformable arm of thin plate configuration, two support members between which said elastically deformable arm extends and with at least one of which it is integral via a root area, means for positively engaging one of said support members with one of said parts so as to rotate therewith, and drive means on the other of said support members for engaging it with the other of said parts so as to rotate therewith for at least part of said defined range of relative angular movement, friction means being disposed between said parts and axially acting elastic clamping means associated therewith, and wherein said friction means incorporate at least one friction ring and means for engaging same with said other of said parts so as to rotate therewith over at least part of said defined range of relative angular movement, and wherein said drive means on said other of said support members of said elastically deformable arm comprise an axial lug whereby it is connected without circumferential play to said friction ring.

16. A torsional damper according to claim 15, wherein said axial lug is integral with said friction ring.

17. A torsional damper suitable for use in a friction clutch plate, comprising at least two coaxial parts mounted to rotate relative to one another within a defined range of relative angular movement, circumferentially acting elastic means between said parts resisting such relative angular movement and incorporating at least on elastically deformable arm of thin plate configuration, two support members between which said elastically deformable arm extends and with at least one of which it is integral via a root area, means for positively engaging one of said support members with one of said parts so as to rotate therewith, and drive means on the other of said support members for engaging it for rotation with the other of said parts for at least part of said defined range of relative angular movement, further comprising, between said parts, friction means and axially acting elastic clamping means associated therewith formed by at least one of said support members of said elastically deformable arm.

18. A torsional damper according to claim 17, wherein said support member and/or said elastically deformable arm is or are formed with circumferential corrugations.

19. A torsional damper suitable for use in a friction clutch plate, comprising at least two coaxial parts mounted to rotate relative to one another within a defined range of relative angular movement, circumferentially acting elastic means between said parts resisting such relative angular movement and incorporating at least one elastically deformable arm of thin plate configuration, two support members between which said elastically deformable arm extends and with at least one of which it is integral via a root area, means for positively engaging one of said support members with one of said parts so as to rotate therewith, and drive means on the other of said support members for engaging it for rotation with the other of said parts for at least part of said defined range of relative angular movement, wherein one of said parts comprises at least two axial centering lugs radially engaged with one of said support members of said elastically deformable arm and the other of said support members is rigidly attached to the other of said parts, said one support member being formed with a bearing surface of part-circular profile cooperating with one of said axial centering lugs.

20. A torsional damper suitable for use in a friction clutch plate, comprising at least two coaxial parts mounted to rotate relative to one another within a defined range of relative angular movement, circumferentially acting elastic means between said parts resisting such relative angular movement and incorporating at least one elastically deformable arm of thin plate configuration, two support members between which said elastically deformable arm extends and with at least one of which it is integral via a root area, means for positively engaging one of said support members with one of said parts so as to rotate therewith, and drive means on the other of said support members for engaging it with the other of said parts so as to rotate therewith for at least part of said defined range of relative angular movement, wherein said root area with which said elastically deformable arm is integral with one of its support members extends in the radial direction, and wherein over at least part of its length said elastically deformable arm extends circumferentially alongside the last mentioned one of said support members from which it is separated by a slot, said slot having a closed end which is enlarged to form an opening which is substantially circular in shape.

21. A torsional damper according to claim 20, wherein said opening is offset relative to said slot towards the axis of the damper.

22. A torsional damper for a friction clutch plate, comprising at least two coaxial parts mounted to rotate relative to each other within a defined range of relative angular movement, circumferentially acting elastic means resisting the angular movement and including at least two chordal spring members operative after a first range of relative angular movement, and an arcuate elastically deformable arm operative during the first range of relative angular movement, said elastically deformable arm being formed in one-piece thin plate, said thin plate including a ring-like inner support member and a circumferentially extending root area at one end of said elastically deformable arm joining it to said inner support arm, said inner support member being fixed to one of said coaxial parts, said elastically deformable arm extending generally circumferentially outwardly of and parallel to a portion of said ring-like support member to define an arcuate slot between said portion of said ring-like support member and said elastically deformable arm, and drive means for rotational engagement with other end of the elastically deformable arm and said other coaxial part.

23. A torsional damper according to claim 22, wherein said elastically deformable arm extends between about 180° and about 360° about the axis of the damper.

24. A torsional damper according to claim 23, wherein said root area runs into a radially enlarged zone of said inner support member.

25. A torsional damper according to claim 24, wherein said thin plate lies substantially in a plane generally perpendicular to the axis of the damper.

* * * * *